Patented Nov. 7, 1922.

1,434,822

UNITED STATES PATENT OFFICE.

EDWARD H. JACOB, OF WEST CHESTER, PENNSYLVANIA.

METHOD FOR THE PROPAGATION AND PROTECTION OF MUSHROOM SPAWN.

No Drawing.   Application filed June 10, 1922.   Serial No. 567,424.

*To all whom it may concern:*

Be it known that I, EDWARD H. JACOB, a citizen of the United States, residing at West Chester, in the county of Chester and State of Pennsylvania, have invented a new and useful Method for the Propagation and Protection of Mushroom Spawn, of which the following is a specification.

My improved method for developing and preserving mushroom spawn is characterized by the sterilization of a body of manure, the inoculation of the sterilized body with the spawn and the germination of the same therein under conditions that will exclude antagonistic germs, and the dehydration of the body impregnated with the developed spawn and protection of the same from the absorption of moisture until it is to be used for growing the mushrooms, for the purpose of preserving the spawn and securing a high degree of fertility.

In the practice of my improved method, I have obtained highly satisfactory results by the following operations.

Horse manure is heated in glass containers at a temperature of 220-250° F. for a period of from three to six hours so as to destroy all the life that may be contained therein. The manure thus sterilized is inoculated with the spawn while in the containers in a sterilized room or under conditions that prevent contact with antagonistic germs which would destroy or attack mushroom spawn and the inoculated bodies are sealed in the containers. The sealed containers with their inoculated contents are stored for a period of from four to six weeks under moderate atmospheric temperature or until it is observed through the walls of the containers that complete or desired germination had been effected. The impregnated bodies are then removed from the containers or the containers from the bodies and the latter are dried by exposing them, or parts into which they were divided to provide readily dried thin sections, say for from one to three days at moderate or warm atmospheric temperature, say 75° F. Then the dried bodies are wrapped and encased in closed containers suitable for preventing them from absorbing moisture or attack, for storage and for shipment.

It will be understood that the character of the body in which the spawn are germinated may be varied (as by the use of rotted leaves in place of manure), as also the character of the containers, the temperature and the time of treatment, the specific example of treatment being by way of illustration and not of limitation. The method contemplates, essentially, the sterilization of a body suitable for inoculation with and germination of the spawn, the protection of the same from destruction or injury from antagonistic germs, and the propagation and preservation of the spawn under sanitary conditions, for commercial purposes and to avoid the necessity for laboratory experiments or treatment.

Having described my invention, I claim:—

1. The method of protecting and propagating mushroom spawn which consists in sterilizing a body suitable for the germination of the spawn therein, inoculating the sterilized body with the spawn, protecting the inoculated body from antagonistic germs, germinating the spawn in said body, and drying said body and the germinated spawn therein.

2. The method of protecting and propagating mushroom spawn which consists in sterilizing a body of manure by heating the same, inoculating the sterilized body and germinating the spawn in the inoculated body in a sealed container, separating the body containing the germinated spawn and the container, and drying said body with the germinated spawn therein.

3. The method of protecting, propagating and preserving mushroom spawn which consists in sterilizing a body of manure in a transparent container, inoculating the sterilized body in said container in a sanitary atmosphere, sealing said container, germinating the spawn in the sealed container, dividing the body containing the germinated spawn, drying the divided parts of the body, and protecting the same from moisture.

4. The method of protecting, propagating and preserving mushroom spawn which consists in sterilizing a body of manure by heating it in a glass container until all life in the manure has been destroyed, inoculating the sterilized manure with mushroom spawn in a sanitary atmosphere and sealing the inoculated body in the container, storing the container with the inoculated body therein for a period of from four to six weeks, removing the impregnated body from the container and dividing it into sections, and drying the sections and protecting them from the absorption of moisture.

In testimony whereof I have hereunto set my name this 9th day of June, 1922.

EDW. H. JACOB.